United States Patent
Miyoshi et al.

(10) Patent No.: US 11,979,054 B2
(45) Date of Patent: *May 7, 2024

(54) SOLAR POWER GENERATION CONTROL DEVICE AND CONTROL METHOD

(71) Applicant: TOYOTA JIDOSHA KABUSHIKI KAISHA, Toyota (JP)

(72) Inventors: Tatsuya Miyoshi, Nisshin (JP); Kazumi Yamada, Toyota (JP); Koichi Go, Nisshin (JP); Haruki Matsuoka, Kuwana (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 378 days.

This patent is subject to a terminal disclaimer.

(21) Appl. No.: 17/402,136

(22) Filed: Aug. 13, 2021

(65) Prior Publication Data
US 2021/0376653 A1 Dec. 2, 2021

Related U.S. Application Data

(63) Continuation of application No. 16/193,234, filed on Nov. 16, 2018, now Pat. No. 11,128,163.

(30) Foreign Application Priority Data

Dec. 20, 2017 (JP) .................. 2017-244125

(51) Int. Cl.
*H02J 7/35* (2006.01)
*H02J 7/00* (2006.01)
*H02S 50/00* (2014.01)

(52) U.S. Cl.
CPC ............. *H02J 7/35* (2013.01); *H02J 7/007* (2013.01); *H02S 50/00* (2013.01); *H02J 7/0048* (2020.01)

(58) Field of Classification Search
CPC ........................................ H02J 7/35
USPC ......................................... 320/101
See application file for complete search history.

(56) References Cited

U.S. PATENT DOCUMENTS

| | | | |
|---|---|---|---|
| 2008/0162968 A1 | 7/2008 | Breen et al. | |
| 2009/0174410 A1* | 7/2009 | Kim | H01M 10/48 324/426 |
| 2010/0207571 A1* | 8/2010 | English | H01M 10/486 320/101 |

(Continued)

FOREIGN PATENT DOCUMENTS

| | | |
|---|---|---|
| JP | 2015-002640 A | 1/2015 |
| JP | 2016-096647 A | 5/2016 |

OTHER PUBLICATIONS

Jun. 11, 2020 U.S. Office Action issued in U.S. Appl. No. 16/193,234.

(Continued)

*Primary Examiner* — Jerry D Robbins
(74) *Attorney, Agent, or Firm* — Oliff PLC

(57) ABSTRACT

A solar power generation control device controls a solar power generation system storing electric power generated by a solar panel in a battery. The solar power generation control device includes a detection unit configured to detect a state of the battery, and a controller configured to control, based on the state of the battery, a sleep time for temporarily stopping the solar power generation system when a predetermined sleep condition is satisfied.

3 Claims, 6 Drawing Sheets

(56) References Cited

U.S. PATENT DOCUMENTS

| | | |
|---|---|---|
| 2011/0285356 A1 | 11/2011 | Maluf et al. |
| 2013/0107594 A1 | 5/2013 | Wagoner et al. |
| 2013/0200845 A1* | 8/2013 | Bito ................ H02J 7/0042 |
| | | 320/109 |
| 2015/0318725 A1 | 11/2015 | Brockman et al. |
| 2016/0134157 A1* | 5/2016 | Maeno ................ H02J 7/35 |
| | | 320/101 |
| 2016/0204625 A1* | 7/2016 | Josephs ............ H02J 7/0048 |
| | | 320/139 |

OTHER PUBLICATIONS

Dec. 14, 2020 Office Action issued in U.S. Appl. No. 16/193,234.
Jun. 17, 2021 Notice of Allowance Issued in U.S. Appl. No. 16/193,234.

* cited by examiner

SOLAR POWER GENERATION CONTROL DEVICE AND CONTROL METHOD

CROSS-REFERENCE TO RELATED APPLICATION(S)

This application is a continuation of U.S. application Ser. No. 16/193,234 filed Nov. 16, 2018, which is based on and claims priority under 35 U.S.C. 119 from Japanese Patent Application No. 2017-244125 filed on Dec. 20, 2017. The contents of the above applications are incorporated herein by reference.

BACKGROUND

1. Technical Field

The present disclosure relates to a solar power generation control device that controls a solar power generation system storing electric power generated by a solar panel in a battery, and a control method that the solar power generation control device executes.

2. Description of Related Art

Japanese Unexamined Patent Application Publication No. 2015-002640 (JP 2015-002640 A) discloses a solar power generation system that appropriately switches start/stop (hereinafter, referred to as "wakeup/sleep") of the system based on generated electric power of a solar cell to efficiently store electric power generated by a solar panel (solar cell) in a battery.

SUMMARY

In the solar power generation system described in JP 2015-002640 A, since the start/stop of the system is determined based on generated electric power of the solar panel, the start and stop of the system may be repeated in a short time according to an electric power generation state of the solar panel, and electric power of the battery may be consumed needlessly.

The disclosure provides a solar power generation control device and a control method capable of suppressing needless consumption of electric power of a battery.

A first aspect of the disclosure relates to a solar power generation control device that controls a solar power generation system storing electric power generated by a solar panel in a battery. The solar power generation control device includes a detection unit and a controller. The detection unit is configured to detect a state of the battery. The controller is configured to control, based on the state of the battery, a sleep time for temporarily stopping the solar power generation system when a predetermined sleep condition is satisfied.

With the solar power generation control device according to the first aspect of the disclosure, the sleep time for temporarily stopping the solar power generation system is controlled based on the state of the battery. With this, when the state of the battery is a state in which electric power consumption is to be suppressed, it is possible to give priority to suppressing needless consumption of electric power.

In the solar power generation control device according to the first aspect of the disclosure, the detection unit may be configured to detect a state of charge as the state of the battery. The controller may be configured to set the sleep time to be longer when the state of charge of the battery is less than a predetermined threshold than when the state of charge of the battery is equal to or greater than the threshold.

With the solar power generation control device according to the first aspect of the disclosure, when the state of charge of the battery is small, it is possible to suppress needless consumption of electric power of the battery due to frequent repetition of start and stop of the solar power generation system.

In the solar power generation control device according to the first aspect of the disclosure, the detection unit may be configured to detect a state of charge as the state of the battery. The controller may be configured to provide a threshold lower than a lower limit value of the state of charge in a predetermined use range of the battery and set the sleep time to be longer when the state of charge of the battery is less than the threshold than when the state of charge of the battery is equal to or greater than the threshold.

With the solar power generation control device according to the first aspect of the disclosure, when the battery is used in a normal use range, since the sleep time is not set to be long wastefully, it is possible to reduce missing an opportunity to use electric power generated by the solar panel.

In the solar power generation control device according to the first aspect of the disclosure, the detection unit may be configured to detect the state of charge as the state of the battery. The controller may be configured to provide a plurality of thresholds in such a manner that a longer sleep time is allocated as a numerical value of the threshold is smaller.

With the solar power generation control device according to the first aspect of the disclosure, when the state of charge of the battery is small, it is possible to suppress needless consumption of electric power of the battery due to frequent repetition of start and stop of the solar power generation system with high accuracy.

In the solar power generation control device according to the first aspect of the disclosure, the controller may be configured to calculate the sleep time through a predetermined arithmetic operation with the state of charge of the battery as an argument.

In the solar power generation control device according to the first aspect of the disclosure, the detection unit may be configured to detect an internal resistance value as the state of the battery. The controller may be configured to control the sleep time based on the internal resistance value of the battery.

Even with the internal resistance value, when the state of the battery is a deterioration state in which electric power consumption is to be suppressed, it is possible to give priority to suppressing needless consumption of electric power.

A second aspect of the disclosure relates to a control method that a solar power generation control device configured to control a solar power generation system storing electric power generated by a solar panel in a battery. The control method includes detecting a state of the battery, and controlling, based on the state of the battery, a sleep time for temporarily stopping the solar power generation system when a predetermined sleep condition is satisfied.

With the control method according to the second aspect of the disclosure, the sleep time for temporarily stopping the solar power generation system is controlled based on the state of the battery. With this, when the state of the battery is a state in which electric power consumption is to be suppressed, it is possible to give priority to suppressing needless consumption of electric power.

With the solar power generation control device and the control method according to the aspects of the disclosure, it is possible to suppress needless consumption of the state of charge of the battery.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Outline

A solar power generation control device and a control method according to an embodiment are used to control, for example, a solar power generation system or the like mounted in a vehicle. In the solar power generation control device, a sleep time for temporarily stopping the solar power generation system is controlled based on a state of a battery. With this, when the state of the battery is a state in which electric power consumption is to be suppressed, it is possible to give priority to suppressing needless consumption of electric power.

Configuration

Figure 1:
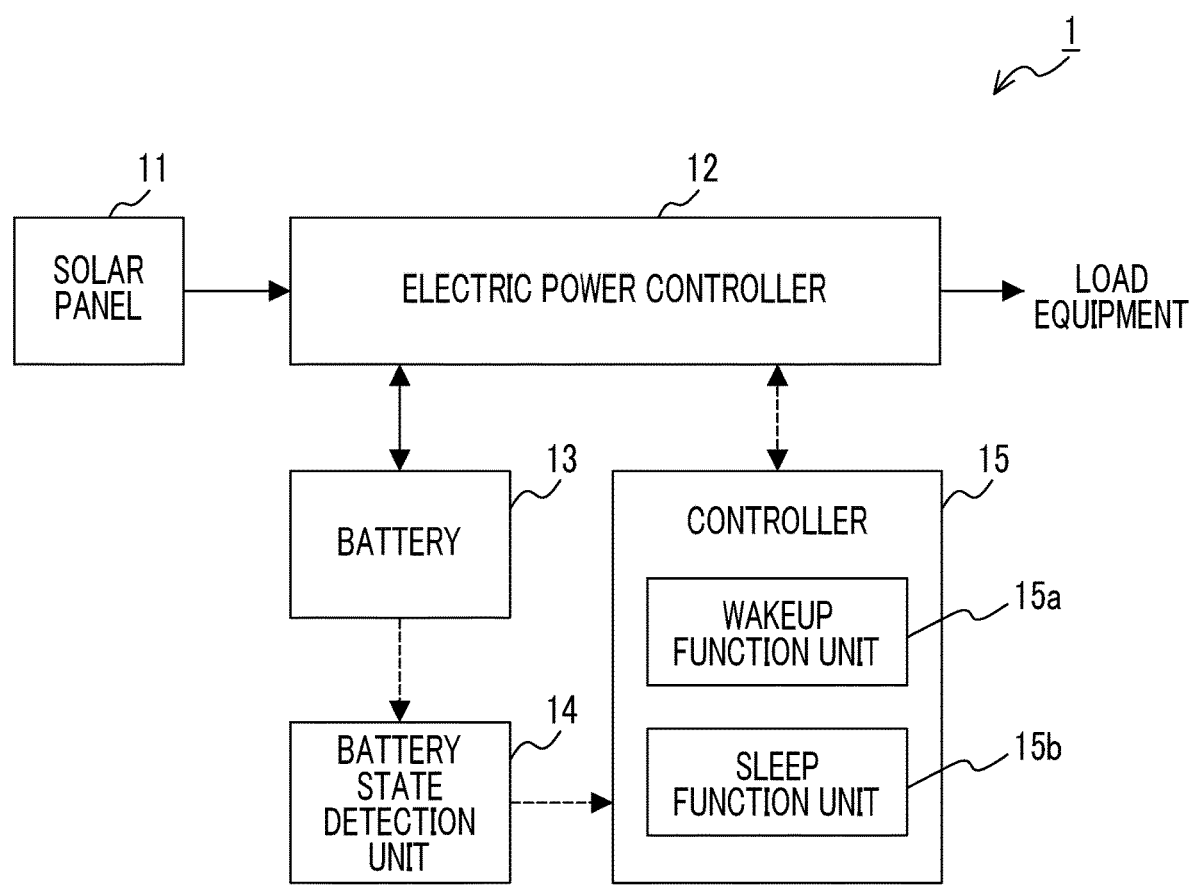
FIG. 1 is a diagram showing a configuration example of a solar power generation system including a solar power generation control device according to an embodiment of the disclosure.

FIG. 1 is a diagram showing a configuration example of a solar power generation system 1 including a solar power generation control device according to an embodiment of the disclosure. The solar power generation system 1 illustrated in FIG. 1 includes a solar panel 11, an electric power controller 12, a battery 13, a battery state detection unit 14, and a controller 15. The battery state detection unit 14 and the controller 15 correspond to the solar power generation control device according to the embodiment.

In FIG. 1, a wiring in which an electric power signal flows is indicated by a solid line, and a wiring in which a detection signal or a control signal flows is indicated by a dotted line.

The solar panel 11 is a solar cell module that receives irradiation of sunlight and performs electric power generation. The solar panel 11 can be provided, for example, on a roof of the vehicle. Electric power obtained by electric power generation of the solar panel 11 is output to the electric power controller 12.

The electric power controller 12 is a configuration for executing predetermined control on generated electric power of the solar panel 11. The electric power controller 12 can receive generated electric power of the solar panel 11 as input, can convert the generated electric power to predetermined electric power, and then, can charge the battery 13 with the predetermined electric power. The electric power controller 12 supplies electric power stored in the battery 13 to predetermined load equipment. The electric power controller 12 can perform switching (transition) from "wakeup control" to "sleep control" described below according to an instruction from the controller 15 to execute control for reducing electric power consumption.

The battery 13 is, for example, an electric power storage element configured to be chargeable and dischargeable, such as a nickel-hydrogen battery. The battery 13 is connected to the electric power controller 12 to enable charging with electric power (generated electric power after conversion) to be received from the electric power controller 12 and discharging of stored electric power to the electric power controller 12.

The battery state detection unit 14 is a configuration for detecting a predetermined state (hereinafter, simply referred to as "the state of the battery 13") relating to the battery 13. As the state of the battery 13, for example, a state of charge (SOC), an internal resistance value, or the like is exemplified. In the embodiment, a case where the state of the battery 13 is the state of charge will be described. The state of charge detected by the battery state detection unit 14 is output to the controller 15.

The controller 15 is constituted of, for example, a microcomputer. The controller 15 instructs execution of various kinds of control in the solar power generation system 1 on the electric power controller 12 based on the generated electric power of the solar panel 11 acquired from the electric power controller 12 and the state of charge detected by the battery state detection unit 14, and the like. The controller 15 can instruct execution of electric power saving control in the solar power generation system 1 with a wakeup function unit 15a and a sleep function unit 15b as one of various kinds of control to be instructed.

The wakeup function unit 15a is a configuration for instructing the electric power controller 12 to execute "wakeup control" for operating the solar power generation system 1 in a normal state. The wakeup control is executed immediately after electric power is supplied, or the like, and can operate the solar power generation system 1. The wakeup control is executed after sleep control described below ends.

The sleep function unit 15b is a configuration for instructing the electric power controller 12 to execute "sleep control" for operating the solar power generation system 1 in an electric power saving state. The sleep control is executed, for example, when a predetermined sleep condition that the generated electric power of the solar panel 11 is lower than a predetermined value during the above-described wakeup control is satisfied, and can stop or restrict at least a part of functions of the solar power generation system 1. The sleep control is continuously executed for a sleep time to be dynamically set, and ends when the sleep time has elapsed. A setting method of the sleep time will be described below.

Control

Figure 2:
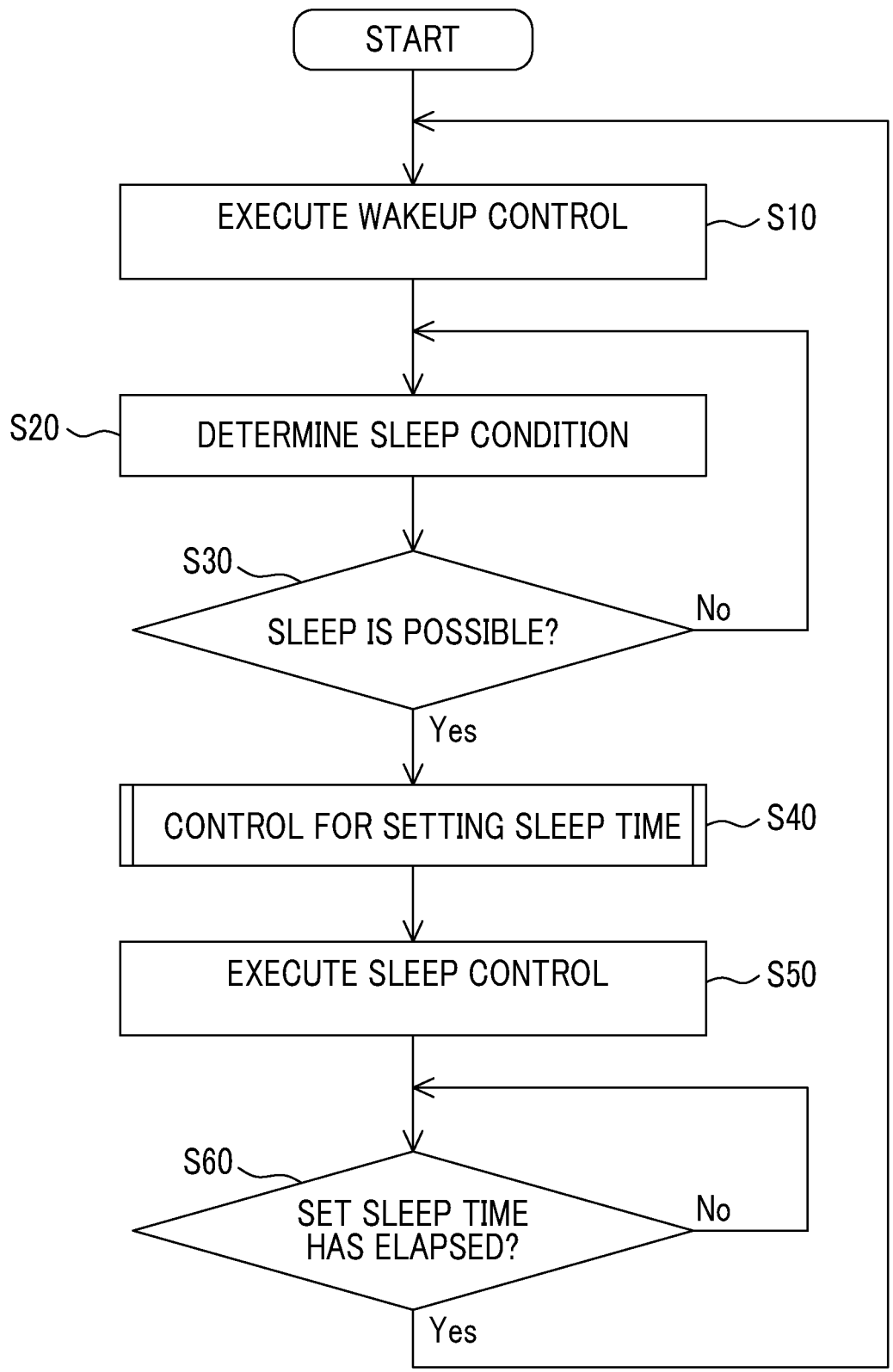
FIG. 2 is a flowchart showing a processing procedure of an electric power saving control method that a controller executes.
Figure 3:
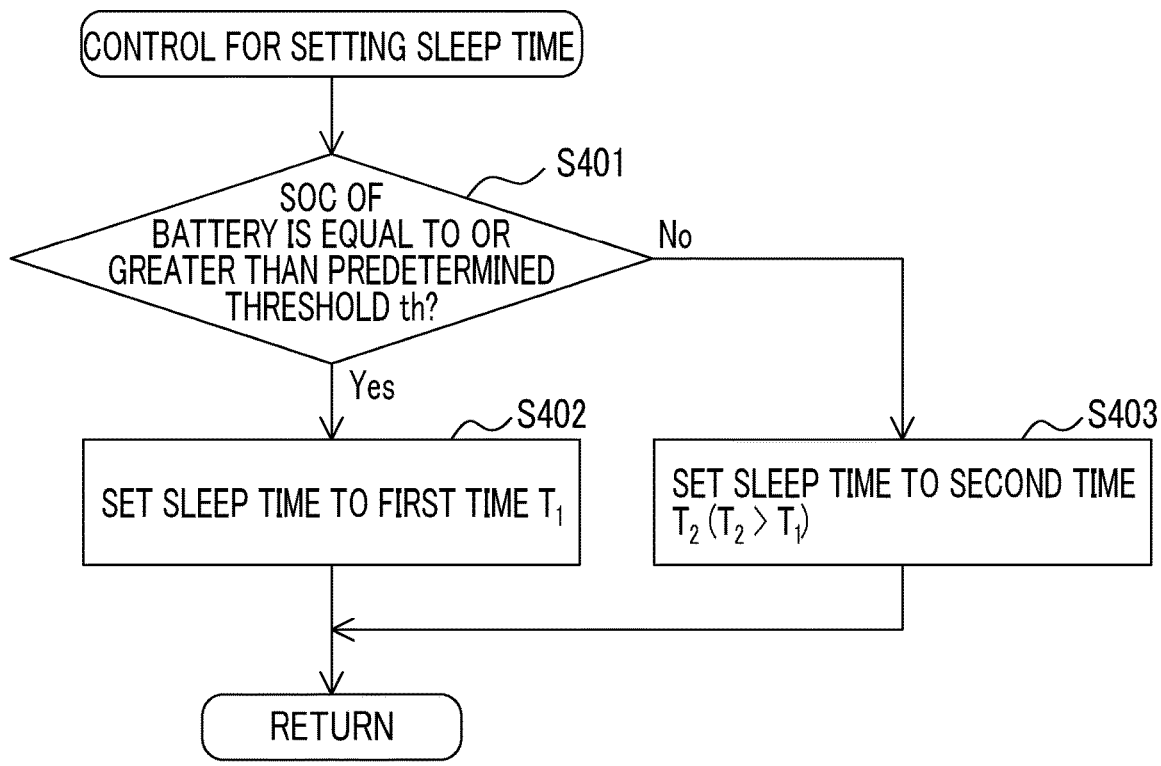
FIG. 3 is a flowchart (setting example 1) showing a detailed processing procedure of control for setting a sleep time of FIG. 2.
Figure 4:
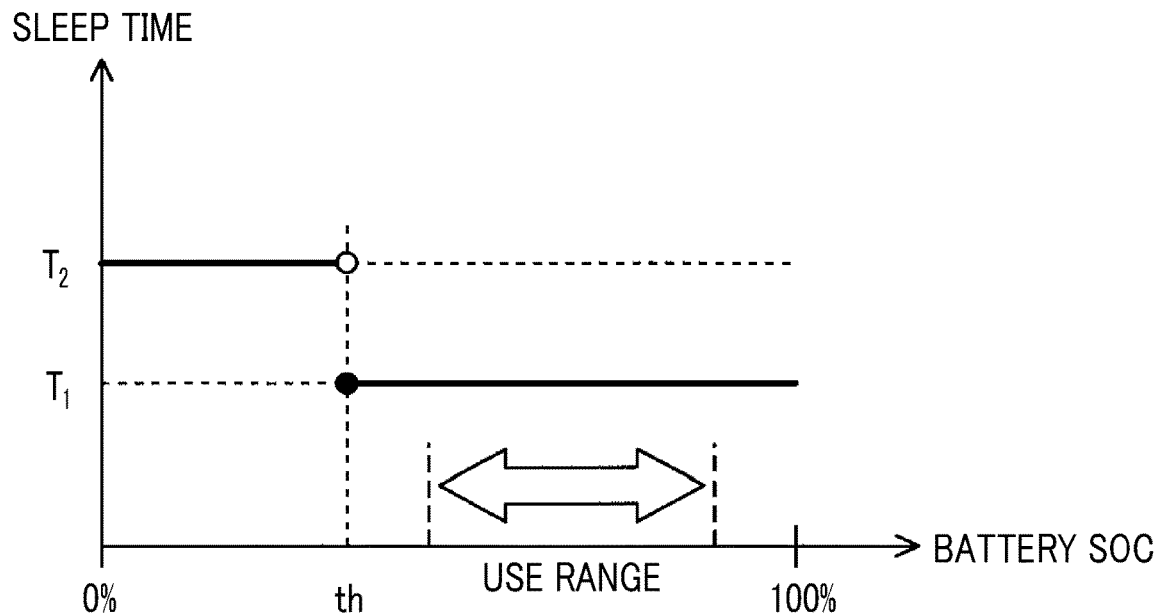
FIG. 4 is a graph illustrating a setting concept of the sleep time of FIG. 3.
Figure 5:
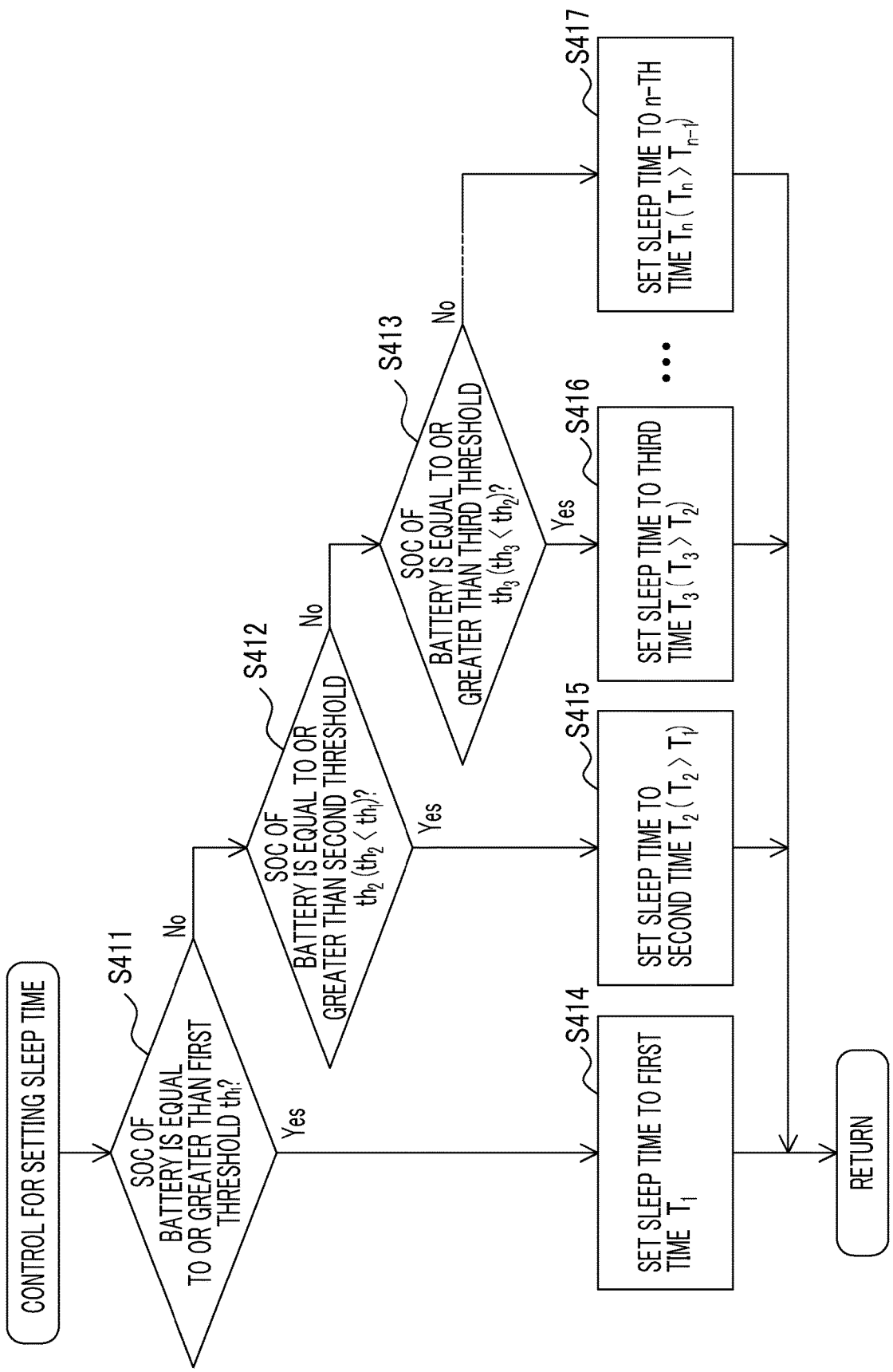
FIG. 5 is a flowchart showing a detailed processing procedure of the control for setting the sleep time of FIG. 2.
Figure 6:
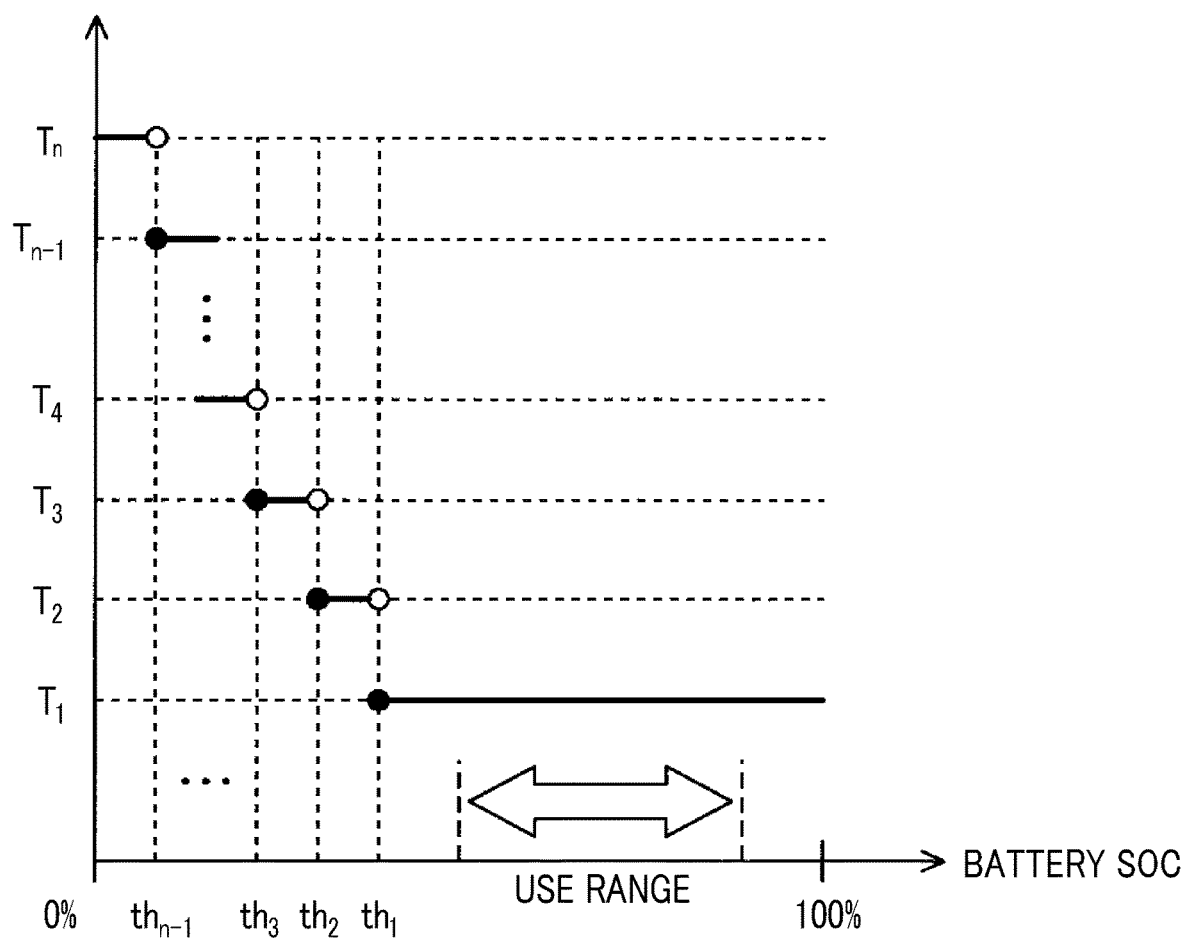
FIG. 6 is a graph illustrating a setting concept of the sleep time of FIG. 5.
Figure 7:
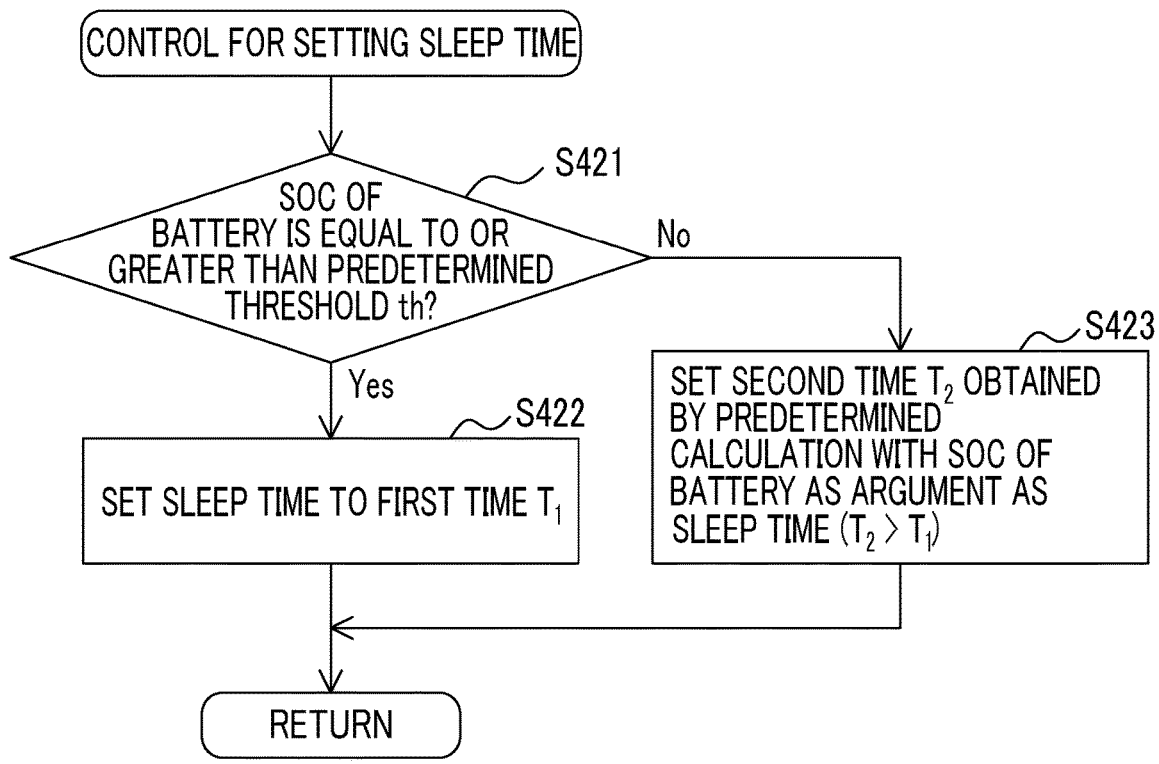
FIG. 7 is a flowchart (setting example 3) showing a detailed processing procedure of the control for setting the sleep time of FIG. 2.
Figure 8:
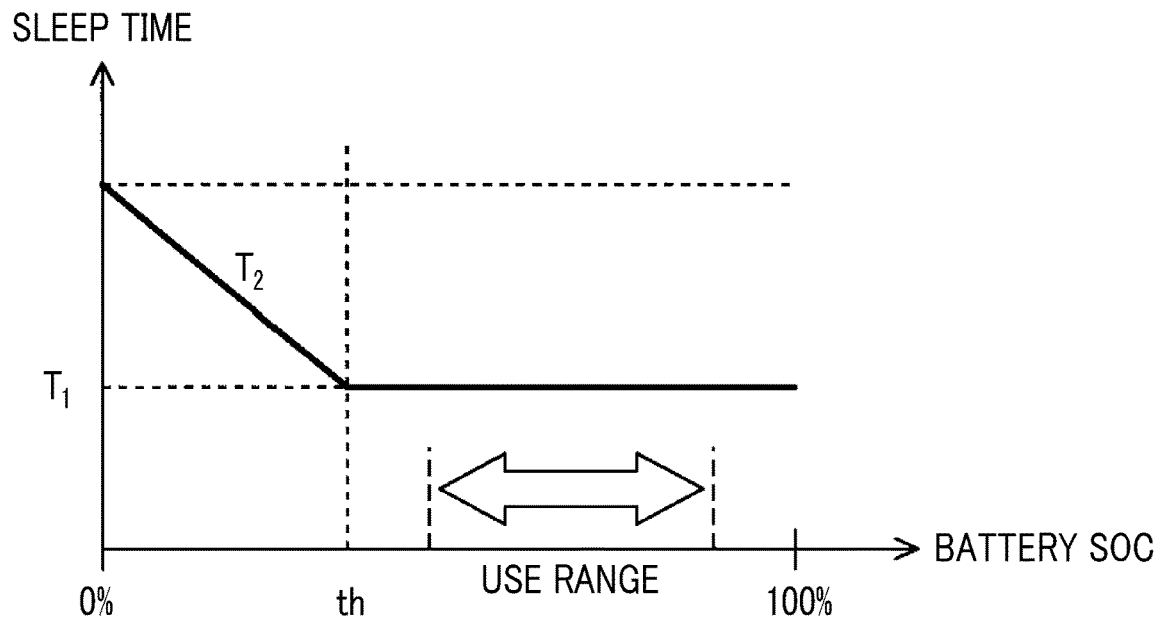
FIG. 8 is a graph illustrating a setting concept of the sleep time of FIG. 7.

Control of the solar power generation system 1 that the solar power generation control device according to the embodiment of the disclosure executes will be described further referring to FIGS. 2 to 8. FIG. 2 is a flowchart showing a processing procedure of an electric power saving control method that the controller 15 according to the embodiment executes. FIGS. 3, 5, and 7 are flowcharts showing a more detailed processing procedure of control for setting the sleep time (Step S40) in FIG. 2. FIGS. 4, 6, and 8 are graphs illustrating setting concepts of the sleep time of FIGS. 3, 5, and 7, respectively.

Electric power saving control shown in FIG. 2 is started when the solar power generation system 1 is operated at power on or the like, and is repeatedly executed until the solar power generation system 1 is stopped at power off or the like.

Step S10: An instruction to execute the wakeup control is given to the electric power controller 12.

Step S20: Determination is made whether or not the solar power generation system 1 satisfies a predetermined sleep condition. In the embodiment, as an example, determination is made whether or not the generated electric power of the solar panel 11 is lower than a predetermined value. The predetermined value can be, for example, minimum electric power consumption needed when the electric power controller 12 processes the generated electric power of the solar panel 11.

Step S30: Determination is made whether or not the solar power generation system 1 can be made sleep (a part of functions are stopped or restricted) based on determination regarding whether or not the sleep condition is satisfied. When determination is made that sleep is possible (Step S30, Yes), the process progresses to Step S40, when determination is made that sleep is not possible (Step S30, No), the process returns to Step S20.

Step S40: The control for setting the sleep time is executed. The sleep time defines a time for which the sleep control is continued when the solar power generation system 1 is switched (transits) from the wakeup control to the sleep control. The sleep time is dynamically set, for example, based on the state of charge of the battery 13 as shown in a setting example 1 (FIG. 3), a setting example 2 (FIG. 5), and a setting example 3 (FIG. 7) described below.

Setting Example 1 (FIG. 3)

Step S401: Determination is made whether or not the state of charge (SOC) of the battery 13 is equal to or greater than a predetermined threshold th. The threshold th can be set to be lower than a lower limit value of a state of charge in a range to be normally used in the battery 13. When the state of charge is equal to or greater than the threshold th (Step S401, Yes), the process progresses to Step S402, and when the state of charge is less than the threshold th (Step S401, No), the process progresses to Step S403.

Step S402: The sleep time is set to a first time $T_1$. When the setting of the sleep time ends, the process progresses to Step S50 of FIG. 2.

Step S403: The sleep time is set to a second time $T_2$. The second time $T_2$ is set to a time longer than the first time $T_1$ ($T_2 > T_1$). When the setting of the sleep time ends, the process progresses to Step S50 of FIG. 2.

The setting concept of the sleep time that is executed in Steps S401 to S403 according to the setting example 1 is shown in FIG. 4.

Setting Example 2 (FIG. 5)

Step S411: Determination is made whether or not the state of charge (SOC) of the battery 13 is equal to or greater than a first threshold $th_1$. The first threshold $th_1$ can be set to be lower than a lower limit value of a state of charge in a range to be normally used in the battery 13. When the state of charge is equal to or greater than the first threshold $th_1$ (Step S411, Yes), the process progresses to Step S414, and when the state of charge is less than the first threshold $th_1$ (Step S411, No), the process progresses to Step S412.

Step S412: Determination is made whether or not the state of charge (SOC) of the battery 13 is equal to or greater than a second threshold $th_2$. The second threshold $th_2$ is set to be lower than the lower limit value of the state of charge in the range to be normally used in the battery 13 and lower than the first threshold $th_1$. When the state of charge is equal to or greater than the second threshold $th_2$ (Step S412, Yes), the process progresses to Step S415, and when the state of charge is less than the second threshold $th_2$ (Step S412, No), the process progresses to Step S413.

Step S413: Determination is made whether or not the state of charge (SOC) of the battery 13 is equal to or greater than a third threshold $th_3$. The third threshold $th_3$ is set to be lower than the lower limit value of the state of charge in the range to be normally used in the battery 13 and lower than the second threshold $th_2$. When the state of charge is equal to or greater than the third threshold $th_3$ (Step S413, Yes), the process progresses to Step S416. When the state of charge is less than the third threshold $th_3$ (Step S413, No), hereinafter, determination branching is sequentially executed until a threshold $th_{n-1}$ similarly, and finally, when the state of charge is less than the threshold $th_{n-1}$, the process progresses to Step S417.

Step S414: The sleep time is set to the first time $T_1$. When the setting of the sleep time ends, the process progresses to Step S50 of FIG. 2.

Step S415: The sleep time is set to the second time $T_2$. The second time $T_2$ is set to a time longer than the first time $T_1$ ($T_2 > T_1$). When the setting of the sleep time ends, the process progresses to Step S50 of FIG. 2.

Step S416: The sleep time is set to a third time $T_3$. The third time $T_3$ is set to a time longer than the second time $T_2$ ($T_3 > T_2$). When the setting of the sleep time ends, the process progresses to Step S50 of FIG. 2.

Step S417: The sleep time is set to an n-th $T_n$. The n-th time $T_n$ is set to a time longer than an (n−1)th time $T_{n-1}$ ($T_n > T_{n-1}$). When the setting of the sleep time ends, the process progresses to Step S50 of FIG. 2. The variable n can be any integer equal to or greater than 2.

The setting concept of the sleep time that is executed in Steps S411 to S417 according to the setting example 2 is shown in FIG. 6. In the setting example 2, a plurality of thresholds is set in such a manner that the longer sleep time is allocated when a numerical value of the threshold is smaller.

Setting Example 3 (FIG. 7)

Step S421: Determination is made whether or not the state of charge (SOC) of the battery 13 is equal to or greater than a predetermined threshold th. The threshold th can be set to be lower than the lower limit value of the state of charge in the range to be normally used in the battery 13. When the state of charge is equal to or greater than the threshold th (Step S421, Yes), the process progresses to Step S422, and when the state of charge is less than the threshold th (Step S421, No), the process progresses to Step S423.

Step S422: The sleep time is set to the first time $T_1$. When the setting of the sleep time ends, the process progresses to Step S50 of FIG. 2.

Step S423: The sleep time is obtained through a predetermined arithmetic operation with the state of charge of the battery 13 as an argument, and the obtained sleep time is set to the second time $T_2$. The second time $T_2$ is set to a time longer than the first time $T_1$ ($T_2>T_1$). When the setting of the sleep time ends, the process progresses to Step S50 of FIG. 2.

The setting concept of the sleep time that is executed in Steps S421 to S423 according to the setting example 3 is shown in FIG. 8. In FIG. 8, although an example where a result of the arithmetic operation is obtained as a straight line has been shown, an arithmetic operation may be performed such that a result is obtained as a curve.

The sleep time can be obtained, for example, by referring to a conversion table in which the state of charge of the battery 13 and the sleep time are associated with each other, instead of the above-described arithmetic operation with the state of charge of the battery 13 as an argument.

Step S50: An instruction to execute the sleep control is given to the electric power controller 12.

Step S60: After the instruction to execute the sleep control is given, determination is made that the sleep time set through the control for setting the sleep time in Step S40 elapses. When determination is made that the sleep time has elapsed (Step S60, Yes), the process returns to Step S10.

In the flowchart of FIG. 2, the timing when the control for setting the sleep time of Step S40 is executed may be any timing before the instruction to execute the sleep control is given to the electric power controller 12 in Step S50. The control for setting the sleep time of Step S40 may be executed (constantly or intermittently) independently of and in parallel with other kinds of control (Steps S10, S20, S30, S50, and S60).

In the embodiment, although an example where the sleep time is controlled based on the state of charge as the state of the battery has been described above, the sleep time may be controlled based on an internal resistance value of the battery instead of the state of charge. The sleep time may be controlled taking into consideration both of the state of charge and the internal resistance value.

Operations and Effects

With the solar power generation control device and the control method according to the embodiment of the disclosure, the state (state of charge, internal resistance value, or the like) of the battery is detected using the battery state detection unit 14, and the sleep time for temporarily stopping the solar power generation system 1 is controlled based on the detected state of the battery 13.

With this, when the state of the battery 13 is a state in which electric power consumption is to be suppressed, it is possible to give priority to restraining electric power from being needlessly consumed. For example, when the state of charge (SOC) of the battery 13 is less than the predetermined threshold th, control for setting the sleep time to be longer than when the state of charge of the battery 13 is equal to or greater than the threshold th. With the above-described control, when the state of charge of the battery 13 is small, it is possible to restrain electric power of the battery 13 from being needlessly consumed due to frequent repetition of the start (wakeup) and the stop (sleep) of the solar power generation system 1.

The solar power generation control device and the control method of the disclosure are available for controlling a solar power generation system mounted in a vehicle, or the like.

What is claimed is:

1. A solar power generation control device that controls a solar power generation system storing electric power generated by a solar panel in a battery, the solar power generation control device comprising:
   a detection unit configured to detect a state of charge of the battery as a state of the battery; and
   a controller configured to:
      control, based on the state of the battery, a sleep time for temporarily stopping the solar power generation system when a predetermined sleep condition is satisfied; and
      set the sleep time to be longer when the state of charge of the battery is less than a predetermined threshold than when the state of charge of the battery is equal to or greater than the threshold.

2. A solar power generation control device that controls a solar power generation system storing electric power generated by a solar panel in a battery, the solar power generation control device comprising:
   a detection unit configured to detect an internal resistance value of the battery as a state of the battery; and
   a controller configured to:
      control, based on the state of the battery, a sleep time for temporarily stopping the solar power generation system when a predetermined sleep condition is satisfied; and
      control the sleep time based on the internal resistance value of the battery.

3. A control method that a solar power generation control device configured to control a solar power generation system storing electric power generated by a solar panel in a battery executes, the control method comprising:
   detecting a state of charge of the battery as a state of the battery;
   controlling, based on the state of the battery, a sleep time for temporarily stopping the solar power generation system when a predetermined sleep condition is satisfied; and
   setting the sleep time to be longer when the state of charge of the battery is less than a predetermined threshold than when the state of charge of the battery is equal to or greater than the threshold.

* * * * *